United States Patent [19]

Billeg, Jr.

[11] 3,838,357

[45] Sept. 24, 1974

[54] APPARATUS FOR USING START-UP OF A CRYSTAL OSCILLATOR TO SYNCHRONIZE POWER TURN-ON IN VARIOUS PORTIONS OF A SYSTEM

[75] Inventor: Robert P. Billeg, Jr., Oklahoma City, Okla.

[73] Assignee: Honeywell Information Systems, Inc., Waltham, Mass.

[22] Filed: Oct. 25, 1973

[21] Appl. No.: 409,532

[52] U.S. Cl. .................... 331/74, 307/293, 328/129, 331/116, 331/172

[51] Int. Cl. .......................................... H03k 17/26

[58] Field of Search ...... 307/293; 328/177, 72, 129; 331/172, 74

[56] References Cited

UNITED STATES PATENTS

| | | | |
|---|---|---|---|
| 3,502,991 | 3/1970 | Sampson | 307/293 |
| 3,518,556 | 6/1970 | Holmboe et al. | 307/293 |
| 3,781,573 | 12/1973 | Weeden, Jr. | 307/293 |

*Primary Examiner*—John Kominski

*Attorney, Agent, or Firm*—Lloyd B. Guernsey; Edward W. Hughes

[57] ABSTRACT

A pair of timing circuits, a pair of flip-flops, a crystal oscillator and a logic circuit provide a first group of signals while oscillations are building up and a second group of signals after oscillations have built up in the crystal oscillator. The timing circuits provide initializing signals for a computer processor when electrical power is initially turned on. The timing circuits also provide a minimum time delay between application of electrical power to the oscillator and the development of the second group of signals. The oscillator provides timing pulses or master clock pulses for the computer processor after the oscillator has stabilized.

4 Claims, 2 Drawing Figures

APPARATUS FOR USING START-UP OF A CRYSTAL OSCILLATOR TO SYNCHRONIZE POWER TURN-ON IN VARIOUS PORTIONS OF A SYSTEM

BACKGROUND OF THE INVENTION

The present invention pertains to low frequency crystal control oscillators and more specifically, to apparatus for using the start-up of a crystal oscillator to synchronize power turn-on in a data processing system.

Present day point-of-sale terminals are used in retail department stores to aid in controlling inventories of merchandize and to summarize the money received. The terminals are distributed throughout the store to replace regular cash registers. These terminals are connected to a central processor which receives signals from the various terminals to record the amount of money received by the store and the stock number of the items of merchandise sold by the store. Each processor contains a crystal oscillator which must be turned on and allowed to start oscillating before other portions of the terminal receive power. The "start-up time" or time between the application of power to a crystal oscillator and the time the oscillator provides a stable output waveform varies over a wide range. It is desirable to turn on power in the other portions of the central processor as quickly as possible; however the oscillator must stabilize before power can be applied to other portions of the processor. Thus, it is desirable that apparatus be used to sense start-up of oscillations and to provide a power turn-on signal as soon as the oscillations have started.

It is, therefore, an object of this invention to provide apparatus which synchronizes the power turn-on in a data processing system with the start-up of a crystal oscillator.

Another object of this invention is to provide apparatus which senses the start of oscillation in the oscillation circuit and then provides a signal to turn on power in other portions of the system.

A further object of this invention is to provide apparatus which senses the start of oscillations in the oscillator circuit and then provides a signal which causes the oscillator circuit to be connected to other portions of the system.

Still another object of this invention is to provide apparatus which supplies a time delay between the application of power to the oscillator circuit and the time of connecting the oscillator circuit to other portions of the system.

SUMMARY OF THE INVENTION

The foregoing objects are achieved in accordance with one embodiment of the present invention by employing a time delay circuit and a means for sensing the operation of a crystal oscillator. The timing circuit provides a minimum time delay between the application of power to the crystal oscillator and the development of signals which cause power turn-on to other portions of the data processing circuit. The apparatus also detects the presence of the oscillations in the oscillator and prevents the development of signals prior to the time the oscillator has started to oscillate.

Other objects and advantages of this invention will become apparent from the following description when taken in connection with the accompanying drawings.

DESCRIPTION OF THE PREFERRED EMBODIMENT

Figure 1:
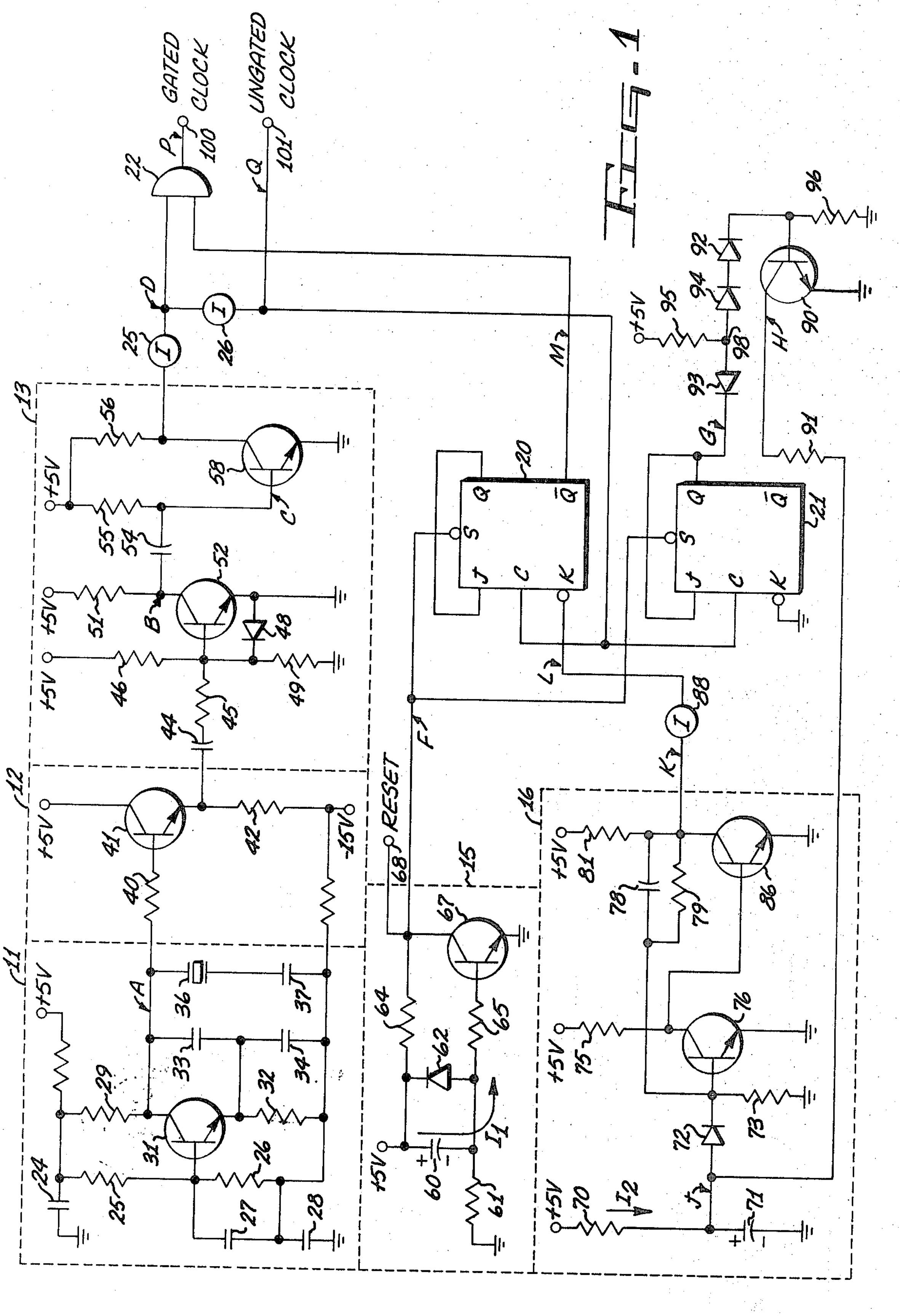
FIG. 1 is a diagram of one embodiment of the apparatus for using start-up of a crystal oscillator to synchronize power turn-on in a data processing system.

The apparatus for using start-up of a crystal oscillator to synchronize power turn-on in a data processing system shown in FIG. 1 includes a Colpitts oscillator 11, an emitter follower 12, a shaper 13, a first timing circuit 15, a second timing circuit 16, a pair of flip-flops 20 and 21 and an AND-gate 22. The oscillator 11 develops a continuous signal which is amplified by the emitter follower 12 and applied to the input lead of the shaper 13. The emitter follower 12 provides isolation between the oscillator and the shaper so that the signal which is required to drive the shaper is supplied by the emitter follower. The emitter follower has a high impedance input on the input lead so that there is very little loading on the crystal oscillator thereby causing the oscillator to be more stable.

The shaped signal from shaper 13 is applied to the upper input lead of the AND-gate 22. The timing circuits 15 and 16 provide a minimum time delay between the time the power is applied to the circuit of FIG. 1 and the time the signal is coupled through the AND-gate 22. The timing circuit 16 and the flip-flops 20 and 21 also ensure that the oscillations in the oscillator 11 have been built up to a steady state value before the signals are coupled through the AND-gate 22. When power is originally applied to the circuit of FIG. 1 the lower input lead of AND-gate 22 has a low value of voltage applied so that the gate is disabled and voltages on the upper input lead of the gate will not be coupled through to the output lead. When the signal from the oscillator has been built up to a steady state value the signal is coupled through a pair of inverters 25 and 26 to the flip-flops 20 and 21 thereby causing the flip-flops to provide a voltage which enables gate 22 allowing the signals from the oscillator to be coupled through to the output terminal 100.

Details of the operation of the circuit of FIG. 1 will now be described in connection with the waveforms of FIG. 2. The JK flip-flops referred to in the specification and shown in FIG. 1 are circuits adapted to operate in either one of two stable states and to transfer from the state in which they are operating to the other stable state upon the application of a trigger signal thereto. In one state of operation the JK flip-flop represents the binary one (1-state) and in the other state the binary zero (0-state). The three leads entering the left-hand side of the flip-flop symbol, for example flip-flop 20, shown in FIG. 1, provide the required trigger signals. The upper lead, the J lead, provides a set signal. The lower, the $\overline{K}$ lead, provides a reset input signal and the center lead provides the trigger signal. When the set input signal on the J lead is positive, and the reset signal on the $\overline{K}$ lead is positive, a positive trigger signal on the C lead causes the flip-flop to change to the 1-state, if it is not already in the 1-state. When the set and reset signals are both positive, a positive trigger signal also causes the flip-flop to transfer to the 0-state if it is not already in the 0-state.

The S lead entering the top of the flip-flop provides a direct set signal. When the zero voltage potential is applied to the S lead the flip-flop sets to the 1-state and remains in the 1-state as long as the zero voltage potential remains on the S lead irrespective of any signals on the J, C and K leads.

An inverter provides the logical operation of inversion for an input signal applied thereto. The inverter provides a positive output signal representing a binary one when the input signal applied thereto has a low value, representing a binary 0. Conversely, the inverter provides an output signal representing a binary 0 when the input signal represents a binary one. Such an inverter is shown in FIG. 1 and is represented by the reference numeral 25.

The AND-gate disclosed in FIG. 1 provides the logical operation of conjunction for binary 1 signals applied thereto. In the system disclosed, the binary 1 is represented by a positive signal, the AND-gate provides a positive output signal representing a binary 1, when and only when, both of the input signals applied thereto are positive and represent binary 1's. The symbol identified by the reference numeral 22 represents an AND-gate having two input leads.

The oscillator 11 of FIG. 1 is a Colpitts circuit in which the crystal unit determines the resonant frequency of the oscillator. The Colpitts oscillator is a standard type of oscillator which has been used in radio and other electronic circuits for many years and is described in various textbooks, including the book "Selected Semiconductor Circuits Handbook" by Seymour Schwartz, published by John Wiley & Son, New York, 1960. When a power is originally applied to the circuit of FIG. 1 a current I1 flows from the +5 volts source to the upper plate of capacitor 60 in timing circuit 15, from the lower plate of capacitor 60 through resistor 65, from base to emitter of transistor 67, thereby rendering transistor 67 conductive. When transistor 67 is conductive the voltage on the collector of transistor 67 has a low value as shown in waveform F of FIG. 2 prior to time *t*1. This low value of voltage is applied to the set input leads of flip-flops 20 and 21 thereby causing flip-flops 20 and 21 to be set. When flip-flop 20 is set a low value of voltage at the $\overline{Q}$ output lead of flip-flop 20 disables AND-gate 22 so that signals from the shaper circuit will not be gated through the gate 22. At the same time flip-flop 21 which is set provides a high value of voltage as shown in waveform G at the Q output lead. This high value of voltage on the Q output lead of flip-flop 21 causes a relatively high value of voltage to appear at the junction point 98 so that a positive value of voltage is coupled through diode 94 to the base of transistor 90 thereby rendering transistor 90 conductive. When transistor 90 is rendered conductive the voltage on the collector of transistor 90 has a very low value so that the capacitor 71 in the timing circuit 16 is discharged. When capacitor 71 is discharged a low value of voltage is applied to the base of transistor 76 so that transistor 76 is rendered nonconductive. When transistor 76 is rendered nonconductive the voltage on the collector is positive so that a current flows from the +5 volt terminal through resistor 75, from base to emitter of transistor 86 thereby rendering transistor 86 conductive. When transistor 86 is rendered conductive the value of voltage on the collector is low as shown prior to time *t*6 in waveform K, while the voltage on the I input lead of flip-flop 20 has a positive value as shown in waveform L. This positive value on the K input lead of flip-flop 20 prevents flip-flop 20 from being reset by a clock pulse on the C input lead.

Figure 2:
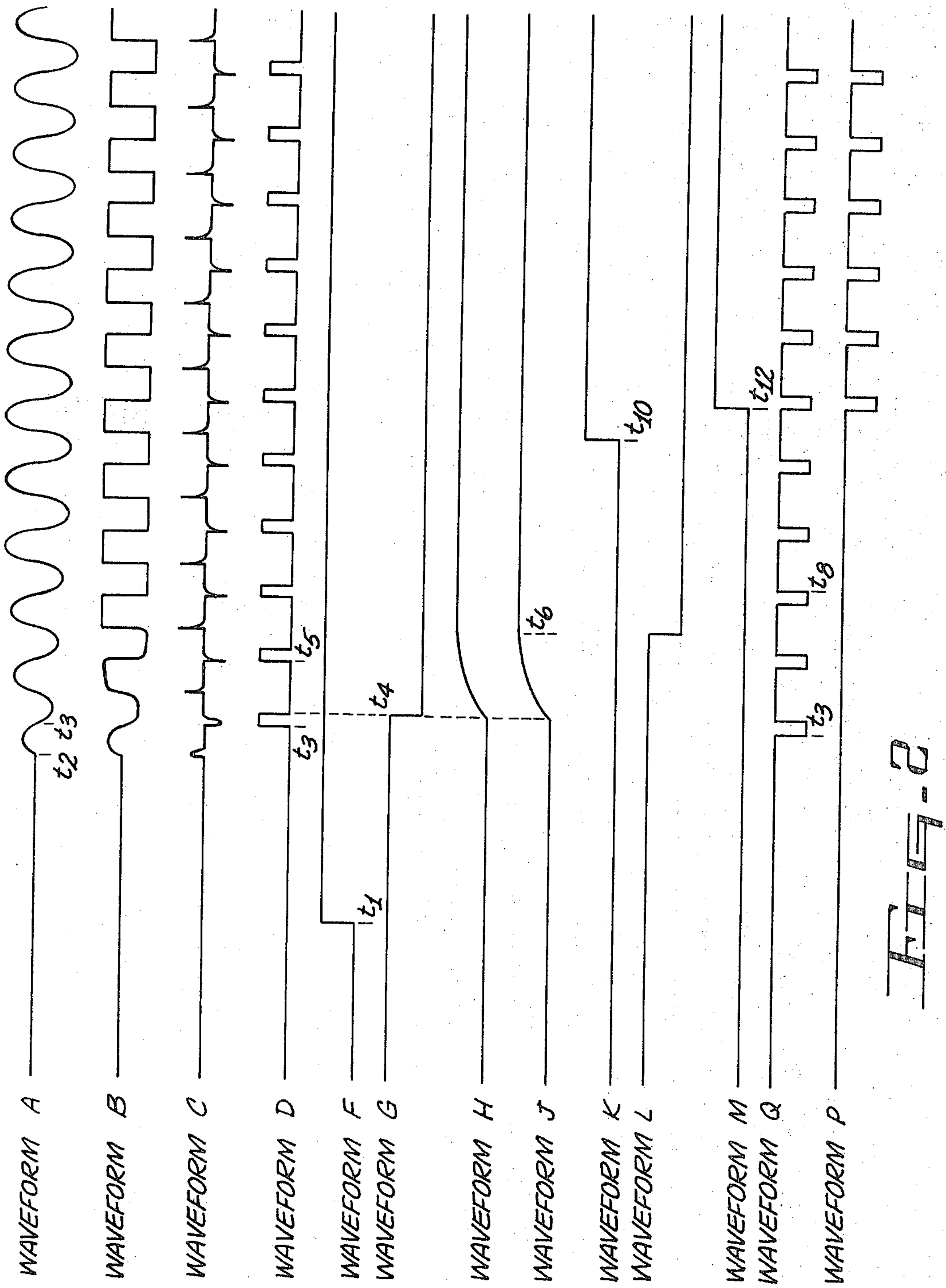
FIG. 2 illustrates waveforms which are useful in explaining the operation of the invention shown in FIG. 1.

When the oscillations in the oscillator 11 build up as shown in waveform A of FIG. 2 these oscillations are amplified by the cathode follower 12 and applied to shaper 13 to provide the clock or timing pulses shown in waveform D. When capacitor 60 in the timing circuit 15 is charged to the polarity shown in FIG. 1 current I1 no longer flows from the base to emitter of transistor 67, that transistor 67 is rendered nonconductive. When transistor 67 is nonconductive the voltage on the S input lead of flip-flops 20 and 21 is positive so that these flip-flops are no longer held in a set condition.

The timing pulses from the output lead of the shaper 13 are coupled through inverters 25 and 26 to the C input lead of flip-flop 21 so that flip-flop 21 is reset by the voltage on the K input lead. When flip-flop 21 is reset the voltage on the Q output lead decreases so that the voltage on junction point 98 decreases thereby causing the voltage at the base of transistor 90 to decrease. When the voltage on the base of transistor 90 decreases transistor 90 is rendered nonconductive so that capacitor 71 in the timing circuit 16 is free to charge. A current I2 now flows from the +5 volt source through resistor 70 to the upper plate of capacitor 71, thereby charging capacitor 71 as shown in waveform J of FIG. 2. When the voltage on the upper plate of capacitor 71 increases to a threshold value a current flows from the upper plate of capacitor 71 through diode 72, from base to emitter of transistor 76 thereby rendering transistor 76 conductive. When transistor 76 is rendered conductive the voltage on the collector of transistor 76 decreases so that the transistor 86 is rendered nonconductive. When transistor 86 is rendered nonconductive the voltage at the collector of transistor 86 increases as shown in waveform K at time t6.

At time *t*6 the voltage from the collector of transistor 86 is inverted by inverter 88 and applied as a low value of voltage to the K input lead of flip-flop 20 causing flip-flop 20 to be reset. When flip-flop 20 is reset a positive voltage on the $\overline{Q}$ output lead of flip-flop 20 is coupled to the lower input lead of gate 22 thereby enabling gate 22 so that the pulses from the output lead of shaper 13 are coupled through the AND-gate 22 to the output terminal 100 of FIG. 1.

While the principles of the invention have now been made clear in an illustrative embodiment, there will be many obvious modifications of the structure, proportions, materials and components without departing from those principles. The appended claims are intended to cover any such modifications.

I claim:

1. Apparatus for using start-up of an oscillator to synchronize power turn-on in various portions of a data processing system, said apparatus comprising:

an oscillator having an output lead;

a shaper having an input lead and an output lead, said input lead of said shaper being coupled to said output lead of said oscillator;

a logic gate having first and second input leads and an output lead, said first input lead of said gate being connected to said output lead of said shaper;

a first timing circuit having an output lead;

a source of potential, said source being coupled to said first timing circuit;

a first flip-flop having first, second, third and fourth input leads and first and second output leads, said first input lead of said first flip-flop being connected to said output lead of said first timing circuit, said second input lead of said first flip-flop being connected to said first output lead of said first flip-flop, said third input lead of said first flip-flop being coupled to said output lead of said shaper, said second output lead of said first flip-flop being connected to said second input lead of said logic gate; and a reference potential, said potential being coupled to said fourth input lead of said first flip-flop.

2. Apparatus for using start-up of the oscillator as defined in claim 1 including:

a emitter follower having an input lead and an output lead, said input lead of said follower being connected to said output lead of said oscillator, said output lead of said follower being connected to said input lead of said shaper.

3. Apparatus for using start-up of an oscillator to synchronize power turn-on in various portions of a computer system, said apparatus comprising:

an oscillator having an output lead;

a shaper having an input lead and an output lead, said input lead of said shaper being coupled to said output lead of said oscillator;

a logic gate having first and second input leads and an output lead, said first input lead of said gate being connected to said output lead of said shaper;

first and second timing circuits each having an output lead;

a source of potential, said source being coupled to said first and to said second timing circuits;

first and second flip-flops each having first, second, third and fourth input leads and first and second output leads, said first input leads of said first and said second flip-flops each being connected to said output lead of said first timing circuit, said second input lead of said first flip-flop being connected to said first output lead of said first flip-flop, said third input leads of said first and said second flip-flops each being coupled to said output lead of said shaper, said second output lead of said first flip-flop being connected to said second input lead of said logic gate, said first output lead of said second flip-flop being connected to said second input lead of said second flip-flop, said first output lead of said second flip-flop being coupled to said second timing circuit; and a reference potential, said potential being coupled to said fourth input lead of said second flip-flop, said output lead of said second timing circuit being coupled to said fourth input lead of said first flip-flop.

4. Apparatus for using start-up of an oscillator to synchronize power turn-on in various portions of the data processing system as defined in claim 3 including:

a emitter follower having an input lead and an output lead, said input lead of said follower being connected to said output lead of said oscillator, said output lead of said follower being connected to said input lead of said shaper.

* * * * *